(12) United States Patent
Iwamura et al.

(10) Patent No.: US 6,862,737 B1
(45) Date of Patent: Mar. 1, 2005

(54) COMMUNICATION DEVICE AND METHOD THEREFOR

(75) Inventors: Kazuaki Iwamura, Tokyo (JP); Yosuke Tajika, Tokyo (JP); Takeo Horiguchi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/556,483

(22) Filed: Apr. 21, 2000

(30) Foreign Application Priority Data

Apr. 23, 1999 (JP) .......................................... 11-116132

(51) Int. Cl.[7] .......................................... G06F 15/173
(52) U.S. Cl. ........................ 719/321; 709/223; 719/310
(58) Field of Search ................................ 719/321, 310; 709/321, 327, 310, 223–226, 229; 345/733, 734

(56) References Cited

U.S. PATENT DOCUMENTS

| | | | | |
|---|---|---|---|---|
| 5,237,693 A | * | 8/1993 | Kiyohara et al. ............ 709/229 |
| 5,586,254 A | * | 12/1996 | Kondo et al. ................. 714/25 |
| 5,611,059 A | * | 3/1997 | Benton et al. ............... 345/734 |
| 5,793,366 A | * | 8/1998 | Mano et al. ................. 345/839 |
| 5,809,329 A | * | 9/1998 | Lichtman et al. ............. 710/8 |
| 5,832,298 A | * | 11/1998 | Sanchez et al. ............... 710/8 |
| 5,996,003 A | * | 11/1999 | Namikata et al. ............ 709/205 |
| 5,999,208 A | * | 12/1999 | McNerney et al. ....... 348/14.08 |
| 6,141,705 A | * | 10/2000 | Anand et al. ................. 710/15 |
| 6,198,479 B1 | * | 3/2001 | Humpleman et al. ........ 345/733 |
| 6,288,716 B1 | * | 9/2001 | Humpleman et al. ....... 345/733 |
| 6,362,836 B1 | * | 3/2002 | Shaw et al. ................. 345/744 |
| 6,370,599 B1 | * | 4/2002 | Anand et al. ................. 710/15 |
| 6,389,466 B1 | * | 5/2002 | Zondag ....................... 709/221 |
| 6,390,371 B1 | * | 5/2002 | Armga et al. .......... 235/472.01 |
| 6,466,971 B1 | * | 10/2002 | Humpleman et al. ....... 709/220 |
| 6,473,811 B1 | * | 10/2002 | Onsen ......................... 710/15 |
| 6,490,617 B1 | * | 12/2002 | Hemphill et al. ........... 709/223 |
| 6,501,750 B1 | * | 12/2002 | Shaffer et al. .............. 370/352 |
| 6,505,245 B1 | * | 1/2003 | North et al. ................. 709/223 |
| 6,546,419 B1 | * | 4/2003 | Humpleman et al. ....... 709/223 |
| 6,546,554 B1 | * | 4/2003 | Schmidt et al. ............. 717/176 |

OTHER PUBLICATIONS

Guttman, E., et al., The Internet Society, "Service Location Protocol, Version 2," Jun. 1999.
"Getting Started—Microsoft Windows 98," Users Manual, Microsoft Corporation, 1998.

* cited by examiner

Primary Examiner—Lewis A. Bullock, Jr.
(74) Attorney, Agent, or Firm—Finnegan, Henderson, Farabow, Garrett & Dunner, L.L.P.

(57) ABSTRACT

A communication device to be used in an ad hoc network environment for enabling the user to utilize an application easily with a desired partner. After a communicable communication device was discovered, a service information provided by the communication device is acquired to display only the selected communication devices in accordance with the service information. The user selects the communication partner and causes the communication device to execute a predetermined application.

4 Claims, 4 Drawing Sheets

COMMUNICATION DEVICE AND METHOD THEREFOR

TECHNICAL FIELD

The present invention relates to a communication device to be utilized in an ad hoc network environment, and a method therefor.

BACKGROUND OF THE INVENTION

As represented by the WWW (World Wide Web), the users of the internet are drastically increasing in recent years. By using the internet, data can be exchanged between arbitrary computers connected with the internet, or an access can be made to a service provided by a computer so that the function of the service can be utilized. In the WWW, for example, the user is enabled by inputting an address called the URL (uniform Resource Locator) to the browser to peruse the data which are laid open by the various computers connected with the internet designated by the URL. By making an access to not the WWW but a mail server, on the other hand, electronic mails can be transmitted and received, or the services such as the FTP for exchanging files with another computer can be utilized.

These applications such as the WWW belong to a system of the server-client type, the roles of which are shared between a server providing the service and a client utilizing the service. In the internet, however, an application of another type acts. In a teleconference system which is realized in the T.120 recommendation standardized in the ITU-T, not only data can be exchanged between specific servers, as viewed at least from the user, but also files can be transmitted or still images can be shared between a plurality of computers having participated in the conference.

In order to utilize these applications, the user is required to ask input or set the address of a partner terminal by any means. In the case of the WWW, it is necessary to input the URL to the browser. In order to utilize the electronic mail, it is necessary to set the address of the mail server for the electronic mail application. Since the address or the like of the mail server is hardly changed, it is usually set by inquiring that of the manager or the like of the mail server.

The utilization of the network such as the internet is flourishing on one hand, and the device technique or the like is developing on the other hand so far as to realize an information device which is so compact that it can be easily carried about. In accordance with a development of the radio technique, on the other hand, there has been widely used the mobile communication system, as represented by a mobile telephone, or a wireless LAN. Under these circumstances, there has been flourishing the ad hoc network technique for generating a network environment by gathering the information devices without any preceding setting.

In the ad hock network, too, it is desired that various applications can be utilized as in the network of the prior art. In the ad hoc network, however, there will occur a situation in which it is impossible to know in advance what terminal is present. Since the address of the computer may be different each time, on the other hand, it is difficult to ask someone for the address in advance.

In the operating system of Microsoft, for example, as described in Getting Started Microsoft Windows 98 (of the registered trade mark), a list of devices, which are connected through the network and properly set, can be viewed by the user of the network computer so that a connectable device can be known even in the ad hoc network. However, what can be done by the computer as can be deemed as the network computer, is to make an access to its local file system but not to execute other applications.

By using the function of the network computer of the operating system of Microsoft, the user is enabled to know which computer exists in the periphery and whether or not it can communicate. When an application is to be actually executed, however, there is a problem that not only the addresses of computers having gathered ad hoc but also what functions can be done by the computers is unknown.

In the following, the functions to be provided by the computer for other communication devices, as can be executed by the teleconference application operated by the FTP server or the mail server, that is, the functions to be executed for communications will be generally called the "services". Since it cannot be practically expected that all the computers have an identical construction, it is difficult to know the services to be provided by other computers in advance.

Even when there are a number of communicable computers existing around, on the other hand, there is another problem that it is difficult to select a desired one of the listed computers.

Therefore, the invention has an object to provide means for enabling the user to designate a proper communication partner easily in a network environment generated ad hoc.

DISCLOSURE OF THE INVENTION

According to an aspect of the invention, there is provided a communication device comprising: detection means for detecting communication devices capable of communicating with a self communication device; attribute information acquiring means for acquiring the attribute information of the communication devices detected by the detection means; selection means for selecting, on the basis of the attribute information acquired by the attribute information acquiring means, one or more communication device useful for the action of the self communication device from the communication devices detected by the detection means; and display means for displaying a discrimination information for discriminating the communication device selected by the selection means.

In the communication device of the first aspect, according to a second aspect, the attribute information is one concerned on services including tasks and informations, which can be provided by the communication device detected by the detection means.

In the communication device of the second aspect, according to a third aspect, further the device comprises of service designating means for designating one of services, and the selection means selects, on the basis of the attribute information, a communication device capable of providing the service which is designated by the service designating means.

According to a fourth aspect, there is provided a communication device comprising: detection means for detecting communication devices capable of communicating with a self communication device; display means for displaying a discrimination information for discriminating a communication devices detected by the detection means; and application execution instruction sending means for sending an instruction information for executing a predetermined application to the communication device displayed in the display means.

According to a fifth aspect, there is provided a communication device comprising: detection means for detecting communication devices capable of communicating with a self communication device; and application execution instruction receiving means for executing a predetermined application when an instruction information for executing the application is received from one of the communication devices detected by the detection means.

According to a sixth aspect, there is provided a communication method comprising: a detection step of detecting communication devices capable of communicating with a self communication device; an attribute information acquiring step of acquiring the attribute information of the communication devices detected by the detection step; a selection step of selecting, on the basis of the attribute information acquired by the attribute information acquiring step, one or more communication device useful for the action of the: self communication device from the communication devices detected by the detection step; and a display step of displaying a discrimination information for discriminating the communication device selected by the selection step.

According to a seventh aspect, in the communication method, the attribute information is one concerned on services including tasks and informations, which can be provided by the communication device detected at the detection step.

According to an eighth aspect, the communication method further comprises a service designating step of designating one of services, and at the selection step, a communication device capable of providing the service which is designated at the service designating means is selected on the basis of the attribute information.

According to a ninth aspect, there is provided a communication method comprising: a detection step of detecting communication devices capable of communicating with a self communication device; a display step of displaying a discrimination information for discriminating the communication devices detected by the detection step; and an application execution instruction sending step of sending an instruction information for executing a predetermined application to the communication device displayed in the display step.

According to tenth aspect, there is provided a communication method comprising: a detection step of detecting communication devices capable of communicating with a self communication device; and an application execution instruction receiving step of executing a predetermined application when an instruction information for executing the application is received from one of the communication devices detected by the detection step.

BEST MODE FOR CARRYING OUT THE INVENTION

Figure 1:
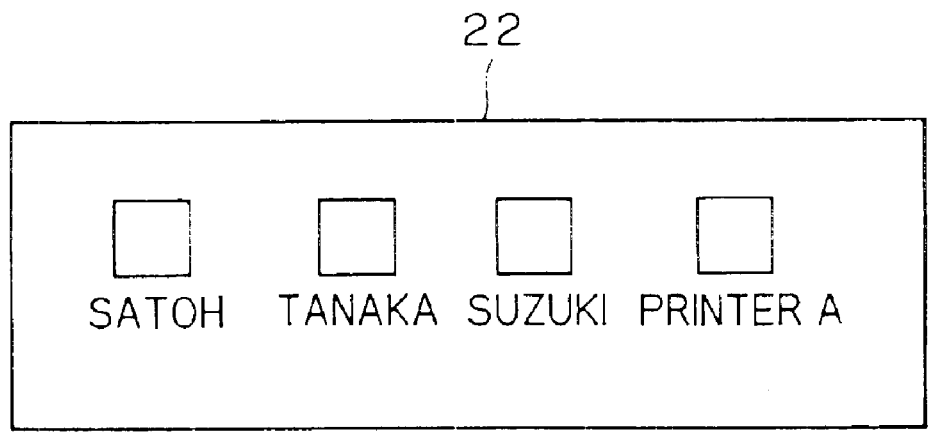
FIG. 1 is a diagram showing a display screen on a display unit of an embodiment.

The present invention will be described in connection with its embodiments.

(First Embodiment)

A communication device (as will be called the "self device") of the first embodiment is provided with a display unit for detecting a communication device (as will be called the "other device") or an information device such as a computer or a mobile telephone existing around and for informing the user of the detected other device so that a desired communication partner can be selected.

The self device acquires, when it detects the other device around, the attribute information of the other device and displays only the selected ones of the detected other devices in accordance with the attribute information. This "attribute information" includes the service to be realized by that other devices. The acquisition of this attribute information may be either in a list of condition satisfying items or in the form of whether or not attributes sent from the self device to be displayed are supported.

By allowing the user to designate the attribute information, on the other hand, only the devices of others in a necessary range can be displayed at each time.

When there exist around a number of other devices having an attribute capable of providing a service of a printer, for example, a less number of other devices are displayed by changing the conditions such that only the other devices of a PostScript printers are displayed, so that the user can select a more proper other device easily.

When communications are made to realize some processing, on the other hand, a significant communication partner is restricted according to the function which is provided by the self device.

For the computer having only the client function of the FTP, for example, only the computer having the function of the FTP server is the significant partner to be connected.

Thus, it is insignificant information for that FTP client whether or not a teleconference application is supported. This other device would be surplus information even if displayed.

In the self device having the function of the FTP client, therefore, a possible partner can be presented and selected exclusively by the user, if only the other device selected according to the attribute of the self device such as the other device having the function of the FTP server is displayed.

This function is effective not only for the user at all times but also for a physically small communication device such as a PDA (Personal Digital Assistant) which has to reduce the display region because the quantity of information displayed can be reduced.

(Second Embodiment)

A communication device (as will be called the "self device") of a second embodiment enables one or a plurality of communication devices (as will be called the "other devices"), as recognized to be able to mutually communicate, which are displayed in a display unit, is provided with an application executing unit for executing an application, when selected in a selected state, in each other device selected.

An application of the prior art such as a client application of the FTP is executed in a computer acting as the client, and the address of a partner to be connected is then inputted.

However, the application is enabled to be executed to simplify the procedure for the user to execute by selecting the other device displayed in the display unit and by connecting the selected other device merely by selecting the application in the selected state.

It is also possible to prevent such an input mistake or the like as might otherwise take place when the address of the displayed other device is to be inputted to the application.

In a system which is provided with such a graphical user interface as realized in the operating system of Microsoft, moreover, applications are expressed icons, for example. A desired application can also be executed by dragging and dropping its icon on the selected other device.

By this user interface, the intuitive operation can be made to improve the convenience of the user.

<Embodiment of the Invention>

One embodiment of the invention will be described in the following.

(First construction Example of Communication Device)

Figure 5:
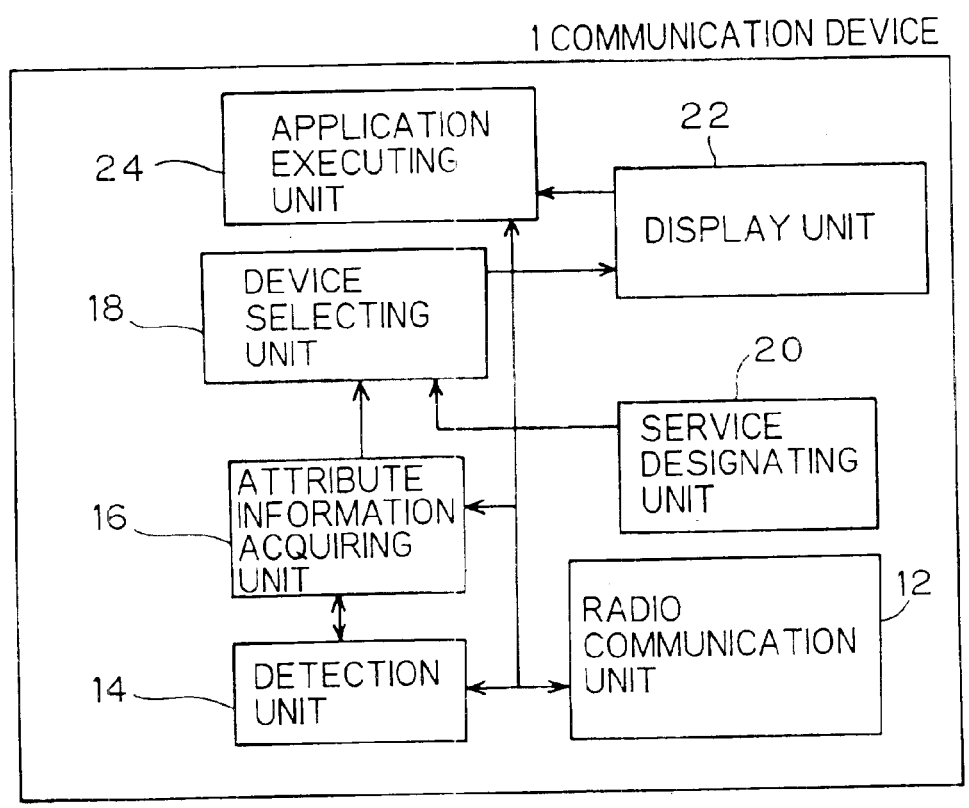
FIG. 5 is a diagram showing a construction of the communication device of the embodiment.

FIG. 5 is a diagram showing a construction of a communication device 1 (as will be called the "self device") of this embodiment.

A radio communication unit 12 realizes a function to exchange messages wirelessly with other communication devices (as will be called the "other devices"). This unit can be realized by employing the technique of wireless LAN or the like using the ISM band.

A detection unit 14 executes a station discovering procedure to detect a communicable other device existing around by sending a message to the radio communication unit 12 or by receiving a message from the other device through the radio communication unit 12.

An attribute information acquiring unit 16 executes a procedure to acquire attribute information for each communicable other device, as detected at the detection unit 14, thereby to acquire the attribute information. At this time, a construction may be made such that the attribute information can be acquired in the form of whether or not a service designated by a service designating unit 20 can be provided. When there is a communication on whether or not a service can be provided from the other device (that is, when a later-described Request message is received), on the other hand, a reply on whether or not the service is possible (that is, a later-described Reply message) is sent through the radio communication unit 12.

On the basis of the service kind designated at the service designating unit 20, a device selecting unit 18 selects the communicable other device, which is detected by using the attribute information acquired by the attribute information acquiring unit 16, and outputs it to a display unit 22.

The display unit 22 displays a discrimination information for discriminating the other device which is selected by the device selecting unit 18, and presents it to the user of the self device 1. Not only the discrimination information of the other device is displayed for the user, but also the user can select one from the display other devices, so that an application executing unit 24 is informed of the discrimination information of the selected other device. At this time, the application executing unit 24 is further informed of the information on the application which is selected to be executed in the selected other device.

On the basis of the discrimination information noticed from the display unit 22, the application executing unit 24 demands each of the selected other devices to execute the selected application.

On the side of the selected other device, the application executing unit 24 has functions to receive the execution demand of the application sent and to execute the designated application in the other device.

Of the modules shown in FIG. 5, the detection unit 14, the attribute information acquiring unit 16, the device selecting unit 18, the service designating unit 20 and the application executing unit 24 can be packaged as a software.

On the other hand, the display unit 22 can utilize a general purpose display device belonging to its self device such as a CRT in a computer, if any, as its display device, and can also realize the portion instructing the display of an image necessary for the display device, as a software.

(Display Example of Communication Device)

FIG. 1 presents a screen displayed on the display unit 22 of the self device 1.

In FIG. 1, there are displayed around in the display unit 22 three computers, as named Satoh, Tanaka and Suzuki, and one printer designated by Printer A, as the communicable other devices.

At this time, as the communicable other devices actually existing around, there exist three computers and two PDA (Personal Digital Assistants) in addition to the computer displaying FIG. 1. For the self device 1 or the computer, however, the remaining other devices are not displayed because they do not provide significant services. This is because the self device 1 can execute the teleconference application and may print the data shared by the application and because the other devices displayed by the user is designated to enable to execute the teleconference application and have the function of the printer.

The three computers displayed have installed the same teleconference application as that of the self device 1 so that a teleconference can be held when the connection is made with those computers. However, the remaining computers are not displayed because they do not have the same teleconference application installed.

When another application is to be executed in the self device 1 by the user, it is possible to set only the computer supporting that application. The display screen of the display unit 22 at this time is shown in FIG. 2.

Figure 2:
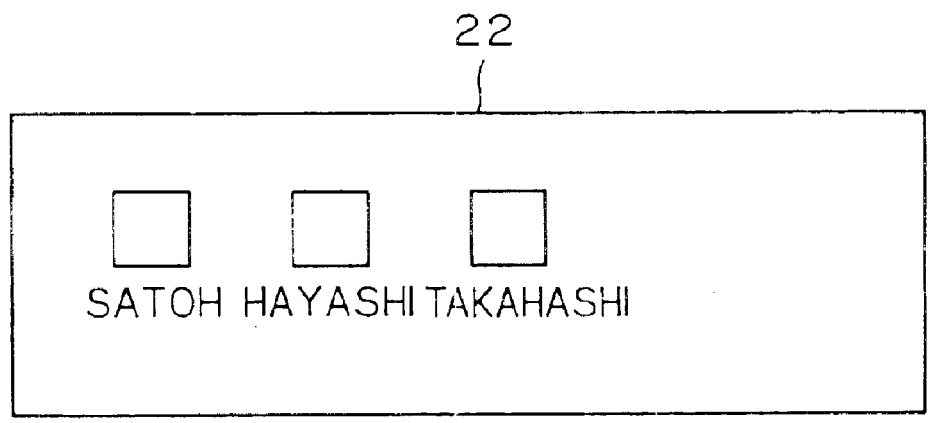
FIG. 2 is a diagram showing another display screen on the display unit of the embodiment.

In FIG. 2, there are displayed not only the computer, as named Satoh in FIG. 1, but also computers named Hayashi and Takahashi. However, there are not displayed the computers named Tanaka and Suzuki and the printer of FIG. 1. In this way, only the other devices necessary for the user can be displayed by designating the application.

(Procedure 1 for Displaying Communication Devices)

Figure 3:
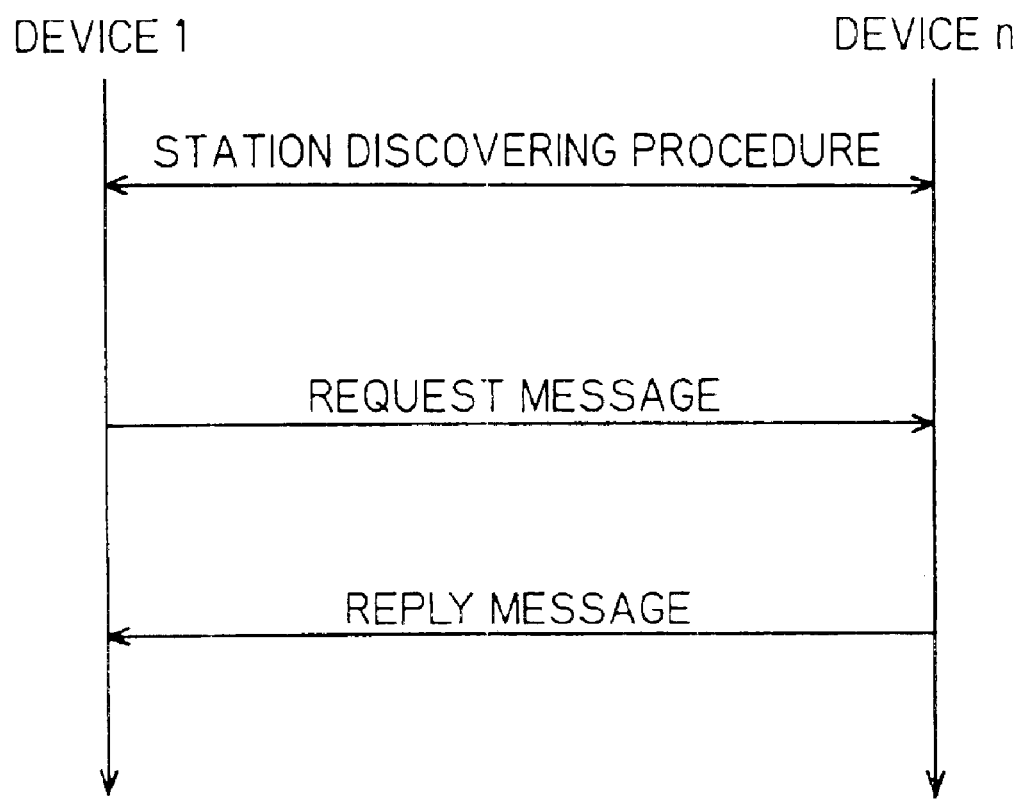
FIG. 3 is a diagram showing a procedure for selecting a communication device to be displayed on the display unit of the embodiment.

FIG. 3 shows an example of realizing procedure when communicable other devices are thus selectively displayed.

At first, the self device 1 executes a station discovering procedure for discovering a communicable other device existing around. This procedure can be realized by the technique, as exemplified by Unexamined Published Japanese Patent Application No. 7-87937.

As a result of this procedure, the self device 1 executes the procedure to acquire the service information for each of the other devices discovered.

At first, the self device 1 sends the Request message containing an information on the service.

The other device n having received the Request message examines whether or not the service designated by that message can be provided, and sends the result as the Reply message to the self device 1.

In accordance with the result contained in the received Reply message, the self device 1 decides whether or not each other device is to be displayed.

In the case of this procedure, the procedure to acquire the service information is repeated for the other devices each time the reference for selecting the other device to be displayed is changed. Despite of this repetition, however, there is achieved an advantage that the quantity of information to be sent and received by one procedure can be reduced.

(Procedure 2 for Displaying Communication Device)

When the Request message is received, another procedure can send a list of possible services as the Reply message.

In this case, the quantity of information to be sent as the Reply message may increase. By storing this value, however, there is achieved an advantage that the procedure need not be executed again when the display is changed.

(Another Procedure for Displaying Communication Device)

On the other hand, this information acquiring procedure can be constructed of one of the prior art such as Service Location Protocol (IETF Internet Draft, draft-ietf-svrlocprotocol-17.txt).

(Second Construction Example of Communication Device)

Next, another construction example of the self device 1 is made by a display in the PDA having a radio interface.

This PDA can execute the applications for an address book and a schedule management. The user carries the PDA ordinarily to use it for the schedule management or the like. Moreover, the PDA shares the address and the schedule information, as stored therein, with the computers and is given a synchronizing function conforming to the IrMC standards so that it can refer to the information stored in the computers while working on the desk. Therefore, the significant communication partner for the PDA is the other devices supporting the synchronizing function of the IrMC standards.

In this case, what is to be displayed need not be changed because it is communicable, but may be decided by the function provided by the PDA.

Therefore, the PDA inquires, if it discovers the communicable other device from around, each of the discovered other devices about whether or not the synchronizing function is supported.

As a result of inquirig, only the other device to provide the synchronizing function is displayed.

The user can select that of the displayed other devices, which is desired to be actually synchronized, and can synchronize the data. As compared with the case in which all the other devices are displayed, therefore, the selection can be made easier to sufficiently display even the self device which is difficult to retain a large place for the area such as the PDA for the display.

In a mobile telephone stored with the address book, like the PDA, when the data are connected to be copied in the PDA or the computer, what is displayed is that of the around communicable other devices, which can manage the address book.

(Other Display Example of Communication Device)

The types of the display of the self device 1 can take various modes.

When the area to be used for the display is extremely restricted as in the mobile telephone, for example, this telephone is desired to list up and present only the names attached to the other devices.

When the display area is excessive in size, on the other hand, the other device can be selected more intuitively by the user if it is displayed together with icons or the like indicating the service it provides.

(Display Example of Another Service of Communication Device)

The services can naturally be displayed not only by the icons but also by their names in a character string.

Apart from what service could be utilized, the information of the face image of the owner of a computer could be used as one expressing the user when it is desired to select a plurality of other devices having the same functions, that is, when the user desires to have a connection with a specific one of computers existing around and having the teleconference application installed.

(Application Executing Procedure of Communication Device)

Here will be described a procedure for executing an application by making a connection with a desired partner when there is displayed only one other device having appropriate attributes from the communicable other devices, as described hereinbefore.

The user selects one or more from the other devices around, as displayed in FIG. 1. This selecting method can take various modes in dependence upon the used modes of the operating system and the display.

This particular other device can be selected, for example, by selecting the area containing the displayed other device to be selected with the mouse.

Another method can be exemplified by moving the cursor to each of the other devices to be selected and by clicking the mouse.

Alternatively, the position of the other device displayed can be touched, when a computer having a touch panel is used.

One or more other devices displayed in the display unit 22 are selected by any of the methods thus above described or by another method.

When an application is selected in this state, connections are made with the selected other devices, and the application is executed in each of the other devices connected so that the user can utilize the application.

Figure 4:
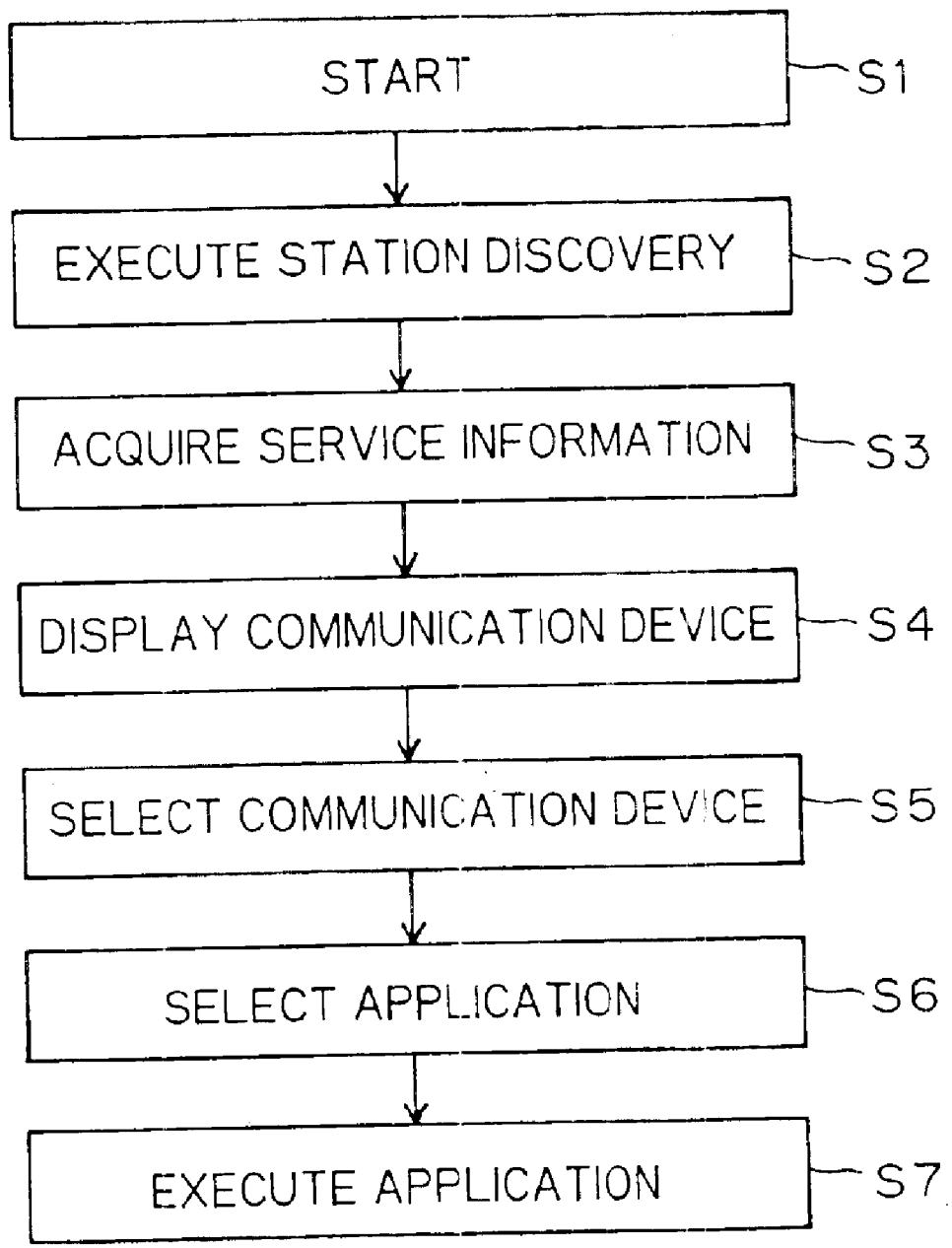
FIG. 4 is a flow chart showing a procedure to the execution of an application.

A flow chart of this procedure is shown in FIG. 4.

At first, the user executes (at Step S1) an application for creating a network environment. However, this portion may be modified such that it is executed at all times as a portion of the operating system or such that it is so set as to be executed at the starting time of the self device so that the user does not instruct it explicitly.

Next, a station discovering procedure is executed (at Step S2), as shown in FIG. 3, to examine communicable other devices around. If other devices are discovered in the station discovering procedure, a service information acquisition is executed (at Step S3) for each of the other device discovered, and a list of appropriately serviceable other devices is displayed (at Step S4).

The user selects one or more demanding an actual communication (at Step S5) from the other devices displayed and selects an application to be utilized together with the selected other devices (at Step S6).

When this procedure is executed, the application is executed (at Step S7) in the selected other devices.

As the means for selecting the application, the following methods can be adopted in addition to the method of selecting the application from the menu of a window or the like in which the communicable other devices is displayed.

When the application is expressed as a graphic element such as the icon, more specifically, the application can be designated by moving the icon or its copy to the screen, in which the partner other device to communicate are selected, or dragging and dropping it.

When the other device to communicate is only one, on the other hand, the icon may be directly dragged and dropped while omitting the procedure of selecting that other device. When the selection of the application is thus executed, the application execution unit 24 sends the message demanding the selected other device for the execution of the application so that the application is executed in the other device having received it.

Services to be provided by one other device may change for a short time either because what can be executed at a time is only one application or because the resources necessary for executing the application are restricted. In such a case, a procedure to inquire whether or not an application can be executed is executed again and confirmed before the execution of the application is actually demanded, and the execution is demanded of only the device which can still provide the service.

INDUSTRIAL APPLICABILITY

Even when communication devices having various functions in an ad hoc environment gather, according to the invention, the user of the communication device is easily enabled to make a connection with a desired partner by a simple operation thereby to execute the necessary application and to utilize those functions.

What is claimed is:

1. A communication device comprising:

service designating means for designating a service;

detection means for detecting communication devices capable of communicating with a local communication device;

attribute information acquiring means for acquiring attribute information for the detected communication devices, wherein said attribute information includes information regarding services capable of being provided by the detected communication devices;

selection means for selecting, on the basis of the acquired attribute information, one or more of the detected communication devices capable of providing the designated service;

display means for displaying the detected communication devices selected by said selection means without displaying the detected devices that are not capable of providing the designated service, wherein a user is capable of selecting one or more of the communication devices for executing an application; and application execution instruction sending means for sending instruction information for executing the application to the one or more communication devices selected for executing the application.

2. A communication device according to claim 1 further comprising:

application execution instruction receiving means for executing a predetermined application when instruction information for executing the application is received from one of the detected communication devices.

3. A communication method comprising:

designating a service to be used as a basis for selecting devices;

detecting communication devices capable of communicating with a local communication device;

acquiring attribute information for the detected communication devices, wherein said attribute information includes services capable of being provided by the detected communication devices;

selecting, on the basis of the acquired attribute information, one or more of the detected communication devices capable of providing the designated service;

displaying the selected communication devices without displaying the detected devices that are not capable of providing the designated service;

selecting one or more of the displayed communication devices for executing an application; and sending instruction information for executing the application to the communications devices selected for executing the application.

4. A communication method according to claim 3, further comprising:

executing a predetermined application when instruction information for executing the application is received from one of the detected communication devices.

* * * * *